Nov. 13, 1923.                                    1,474,122
                    B. F. SEYMOUR
           RESILIENT TRANSMISSION AND BEARING
              Filed July 15, 1919      2 Sheets-Sheet 2
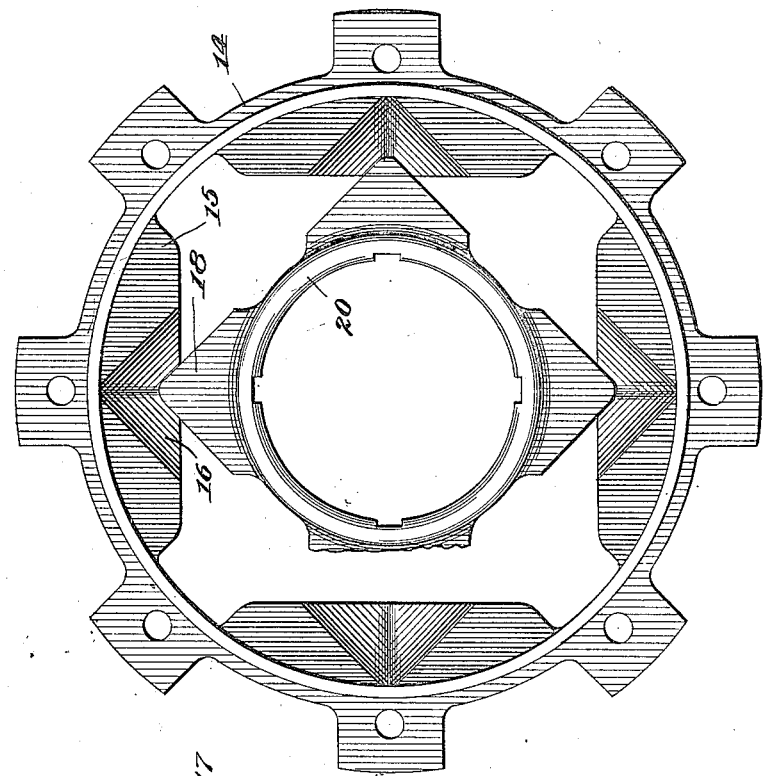
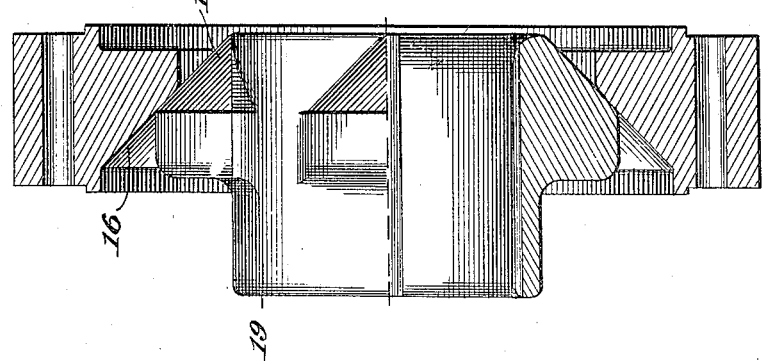
Inventor:
B. F. Seymour,
Att'y.

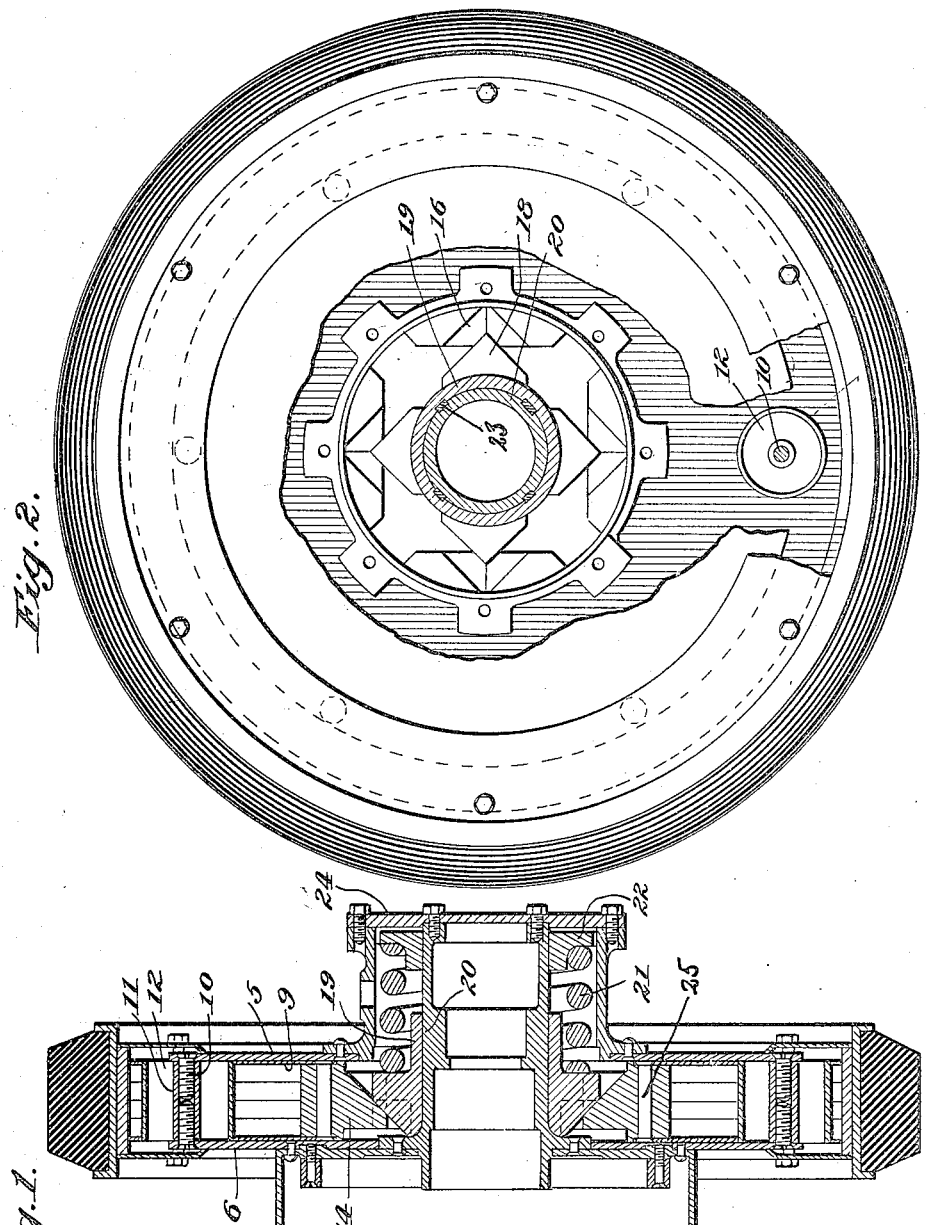

Patented Nov. 13, 1923.

1,474,122

UNITED STATES PATENT OFFICE.

BENJAMIN F. SEYMOUR, OF INDIANAPOLIS, INDIANA.

RESILIENT TRANSMISSION AND BEARING.

Application filed July 15, 1919. Serial No. 310,970.

*To all whom it may concern:*

Be it known that BENJAMIN F. SEYMOUR, a citizen of the United States, residing at Indianapolis, in the county of Marion and State of Indiana, has invented certain new and useful Improvements in Resilient Transmissions and Bearings; and he does hereby declare the following to be a full, clear, and exact description of the invention, such as will enable others skilled in the art to which it appertains to make and use the same.

The present invention relates to resilient transmission and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The present disclosure is proposed as an improvement over the type of resilient transmission and bearing set forth in my co-pending application, Serial No. 302,416.

The invention is shown by way of illustration in the accompanying drawings wherein, Figure 1 is a central sectional view showing the application of the device to a vehicle wheel, Figure 2, a side elevational view thereof, Figure 3, an enlarged detail view, partly in section, of the transmitting and bearing elements per se, and Figure 4 is a similar view thereof taken at right angles to Figure 3.

Referring to the construction in further detail the construction consists of a hub portion formed of two side plates, or housing members, 5 and 6, which are disposed against the inner rim portion 9 of the wheel, as shown. The two hub members 5 and 6 are secured to the wheel rim by the series of pairs of bolts 10 screwed into threaded sleeves 11 that serve as spacing elements and which are located within the spaces, or chambers, 12, as indicated in Figures 1 and 2. It will be understood of course that said spaces 12 are provided to allow the wheel rim to have limited radial movement with respect to the axis of the wheel.

The resilient transmission and bearing device per se consists of an inwardly disposed flange 14 detachably secured to the rim portion 9, and constructed to provide a plurality of centrally disposed segmental sections 15 (see Figures 3 and 4). The several segmental portions 15 are each cut away on one face, as at 16, to provide right-angular cam surfaces that cooperate with the complemental cam surfaces 17 formed on the several dogs 18. Said dogs 18 are formed integral with the sleeve 19 and are adapted to have sliding movement on the hub part 20 as the aforesaid cam elements co-act. Said flange 14 is secured to the wheel rim portion by bolts 25 as shown.

The sleeve 19 carrying the several dogs 18 is held in operative position and under the required tension by the spring 21 which seats against said dogs and the collar 22 suitably mounted on the hub part 20, as shown.

Said sleeve 19 is prevented from having angular movement on the member 20 by the keys 23 fitting in key-ways formed in said sleeve and the member 20 as shown. And the removable closure plate 24 readily permits of access to the interior of the hub.

In general the disclosure herein may be defined as cooperable compound wedge elements, one of which is the male, and the other, the female, and the arrangement is such that the male elements may be carried by the inner wheel rim and the female elements on the sliding element. The construction further provides for an arrangement wherein a greater or lesser number of cam elements may be employed. It will be evident of course that the respective angle of the cam elements will vary commensurate with the number of elements employed.

It will therefore be seen from the foregoing that any motion or shock of the shaft or axle will transmit a like movement to the wheel rim through the medium of the dogs, and that such transmission will be flexible or resilient in nature. And it will be further seen that any jarring motion imparted to the wheel will be resiliently taken up by the cooperating cam elements together with the spring.

It will be obvious of course that different forms of construction may be provided in lieu of that disclosed and described herein. And while I have shown and described certain apparatus for accomplishing the results stated it is to be understood that I am not limited to the precise details shown but may on the other hand adopt such modifications or changes within the scope of the claims to better suit the end in view.

Having thus fully described my said invention, what I claim as new and desire to secure by Letters Patent, is:

1. In a combined resilient bearing and drive for vehicle wheels, the combination of a hub member, a rim member mounted to have limited radial movement on said hub member, a sleeve member axially movable on the hub member, said rim and sleeve member having respectively annularly arranged and right-angled cam surfaces, the surfaces of the sleeve and rim being in contact, and a resilient member holding said surfaces in engagement, substantially as set forth.

2. In a combined resilient bearing and drive for vehicle wheels, the combination of a hub member, a wheel rim mounted to have limited radial movement on the hub member, a sleeve mounted to have axial movement on said hub member, said sleeve and rim having on one side respectively a plurality of right-angular cam surfaces, the surfaces of the rim and hub being in contact, and a spring mounted on the hub holding said cam surfaces in engagement and providing the bearing and drive, substantially as set forth.

3. In a combined resilient bearing and transmission for vehicle wheels, the combination of a hub member, a wheel rim mounted to have limited radial movement thereon, said rim having a plurality of inwardly disposed segmental members having right-angular cam surfaces, a sleeve member axially movable on the hub and having segmental members formed with right-angular cam surfaces engaging the cam surfaces of said rim, and a spring holding said cam surfaces in engagement and providing the bearing and drive, substantially as set forth.

In testimony whereof I affix my signature.

BENJAMIN F. SEYMOUR.